H. FRANCISCO, dec'd.

Mary E. Francisco, Adm'x. A. A. Abbott, Assignee by mesne Assignments.

SLEIGH KNEES.

No. 7,812. Reissued July 24, 1877.

WITNESSES:

F. A. Herring

S. W. Rauss

INVENTOR:

Arthur A. Abbott

Assignee of Henry Francisco, dec'd

By Gridley & Sherburne

Attys

N. PETERS, PHOTO-LITHOGRAPHER, WASHINGTON, D. C.

UNITED STATES PATENT OFFICE.

ARTHUR A. ABBOTT, OF CHICAGO, ILL., ASSIGNEE, BY MESNE ASSIGNMENTS, OF MARY E. FRANCISCO, ADMINISTRATRIX OF HENRY FRANCISCO, DECEASED.

IMPROVEMENT IN SLEIGH-KNEES.

Specification forming part of Letters Patent No. 56,334, dated July 10, 1866; Reissue No. 7,812, dated July 24, 1877; application filed March 24, 1876.

*To all whom it may concern:*

Be it known that HENRY FRANCISCO, late of Lake Mills, in the county of Jefferson and State of Wisconsin, now deceased, did invent certain new and useful Improvements in Sleigh-Knees; and that I, ARTHUR A. ABBOTT, of Chicago, in the county of Cook and State of Illinois, assignee, by mesne assignments, of MARY E. FRANCISCO, administratrix of the estate of the said HENRY FRANCISCO, deceased, do hereby declare the following to be a full, clear, and exact description of the said invention of the said HENRY FRANCISCO, deceased, which will enable others skilled in the art to which said invention appertains to make and use the same, reference being had to the accompanying drawings, forming part of this specification, in which—

Figure 1:
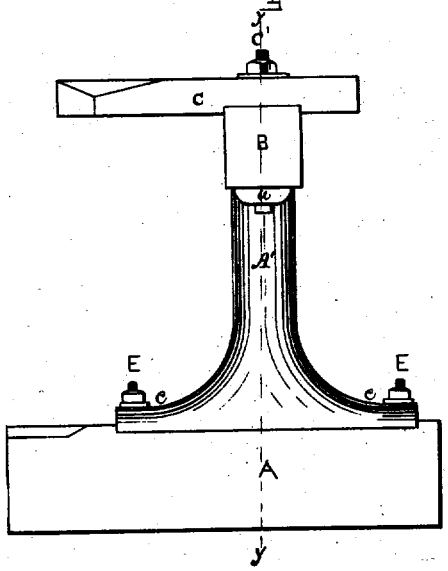
Figure 2:
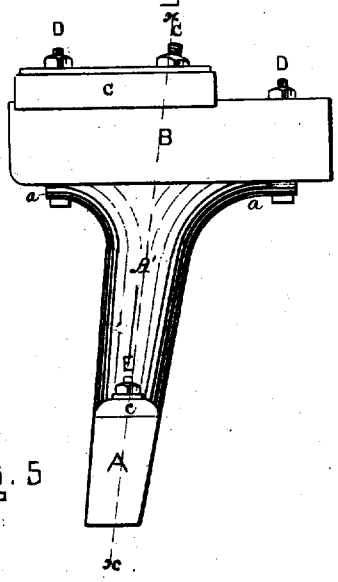
Figure 5:
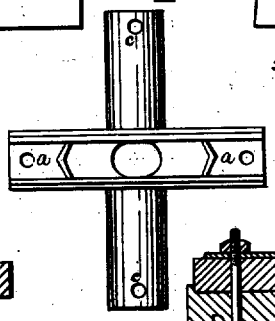
Figure 3:
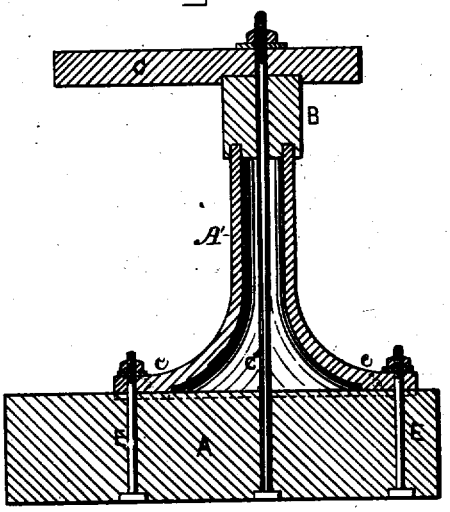
Figure 4:
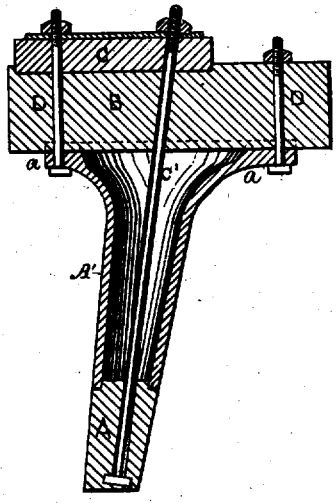

Figure 1 represents a side elevation of a sleigh-knee embodying the said invention, and showing the manner of connecting the sleigh-knee to the beam and runner. Fig. 2 represents an end elevation of the same. Fig. 3 represents a longitudinal sectional elevation, taken on the line *x x*, drawn through Fig. 2. Fig. 4 represents a transverse sectional elevation, taken on the line *y y*, drawn through Fig. 1. Fig. 5 represents a general plan or top view of the knee detached from the beam and runner.

Like letters of reference indicate like parts.

The object of this invention is to improve the construction of those parts of a sleigh-knee interposed between the beams and runners, and commonly known as the knees.

The invention consists in a cast or malleable iron column or knee, provided at its upper end with flanges, one extending inward and the other outward, to receive the bolts connecting the knee to the beam, and also provided at its lower end with flanges, one extending forward and the other backward, to receive the bolts connecting the knee to the runner.

The invention also consists in providing the upper and lower ends of said column or knee with grooves, arranged respectively at right angles to each other, one to receive the upper edge of the runner and the other the lower edge of the beam, all of which will be more fully understood from the following description:

In the drawing, A represents the runner, B the beam, and C the fender, of an ordinary sleigh, all of which are made in the usual manner. A′ is the knee, interposed between the beam and the runner, and is made of cast or malleable iron, and of the proper length to elevate the beam to the required height above the runner; and it is provided at its upper end with flanges *a a*, one extending inward toward the center of the sleigh and the other outward toward the end of the beam, as shown in Figs. 2 and 4, and at its lower end with flanges *c c*, one extending forward and the other backward at right angles to the flanges *a a*, as shown in Figs. 1 and 3.

The column or body portion of the knee is made hollow its entire length, as shown in Figs. 3 and 4, the object being to allow the knee to be made of proper size to insure the required lateral strength without the employment of an unnecessary amount of metal.

D D are wrought-metal screw-bolts passing through the beam and flanges *a a* of the knee, by which means the upper end of the knee and the beam are connected firmly together. E E are like bolts passing through the runner and flanges *c c*, and connecting the lower end of the knee to the runner.

C′ is a wrought-iron screw-bolt passing through the runner, and extending upward through the hollow in the knee, and through the beam and fender, connecting the several parts firmly together.

The lower extremity of the knee is provided with a groove formed longitudinally in the flanges *c c*, into which the upper edge of the runner is closely fitted, and at the upper end with a groove formed in the direction of the length of the flanges *a a*, adapted to receive the lower edge of the beam.

The plane of the upper surface of the knee is so arranged with respect to the vertical plane of the center of the knee as to give the requisite lateral pitch or incline to the runners when the beams, runners, and knees are bolted together.

The sleigh-knees, constructed as described, are much cheaper, stronger, and more durable than wooden knees. By casting them in a mold they are all of uniform size, length, and configuration; and by casting them in one piece they require no manipulation or finishing after being taken from the mold. They can be made smaller than when made of wood, and, consequently, offer less resistance to, and will pass more easily through, the snow.

I am aware that a cast or malleable iron sleigh-knee, provided at its upper end with a tapering socket to receive the end of the beam, as shown in Letters Patent issued to S. E. Oviatt, October 27, 1863, has been used; but I do not claim such.

Having thus described, and what I claim as, the invention of the said HENRY FRANCISCO, deceased, and desire to secure by Letters Patent, is—

1. A cast or malleable iron hollow sleigh-knee, provided at its upper end with flanges *a a*, one extending inward and the other outward, and adjusted to fit against the lower edge of the beam to receive the bolts connecting them to the beam on opposite sides of the knee, substantially as specified.

2. A cast or malleable iron sleigh-knee, provided at its upper end with the grooved flanges *a a*, to receive the lower edge of the beam, substantially as specified.

3. A cast or malleable iron sleigh-knee, provided at its lower end with the grooved flanges *c c*, to receive the upper edge of the runner, substantially as specified.

4. A cast or malleable iron sleigh-knee, provided at its upper end with the grooved flanges *a a*, and at its lower end with the grooved flanges *c c*, substantially as specified.

5. A hollow cast or malleable iron sleigh-knee, connected at its ends to the upper edge of the runner and lower edge of the beam by vertical bolts passing through the knee, substantially as specified.

ARTHUR A. ABBOTT,
*Assignee of Henry Francisco, deceased.*

Witnesses:
N. C. GRIDLEY,
N. H. SHERBURNE.